US009110236B2

(12) United States Patent
Saito et al.

(10) Patent No.: US 9,110,236 B2
(45) Date of Patent: Aug. 18, 2015

(54) RETROREFLECTIVE ELEMENTS

(71) Applicant: 3M INNOVATIVE PROPERTIES COMPANY, St. Paul, MN (US)

(72) Inventors: Junichi Saito, Yamagata Prefecture (JP); Toshihiro Kasai, Kanagawa (JP); Yuji Hiroshige, Tokyo (JP); Mayumi Yoshikawa, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/234,241

(22) PCT Filed: Sep. 20, 2012

(86) PCT No.: PCT/US2012/056359
§ 371 (c)(1),
(2) Date: Jan. 22, 2014

(87) PCT Pub. No.: WO2013/043884
PCT Pub. Date: Mar. 28, 2013

(65) Prior Publication Data
US 2014/0233102 A1 Aug. 21, 2014

Related U.S. Application Data

(60) Provisional application No. 61/536,738, filed on Sep. 20, 2011.

(51) Int. Cl.
*G02B 5/128* (2006.01)
*E01F 9/04* (2006.01)
(52) U.S. Cl.
CPC ............... *G02B 5/128* (2013.01); *E01F 9/044* (2013.01)

(58) Field of Classification Search
CPC .......... G02B 5/126; G02B 5/129; G02B 5/136
USPC .................................. 359/534–537, 529, 530
See application file for complete search history.

(56) References Cited

U.S. PATENT DOCUMENTS

| | | | |
|---|---|---|---|
| 3,252,376 A | 5/1966 | Vries | |
| 3,254,563 A * | 6/1966 | De Vries et al. | 359/539 |
| 3,418,896 A | 12/1968 | Rideout | |
| 5,302,048 A | 4/1994 | Paulos et al. | |
| 5,676,488 A | 10/1997 | Hedblom | |
| 5,942,280 A * | 8/1999 | Mathers et al. | 427/163.4 |
| 6,412,957 B1 | 7/2002 | Oba | |
| 7,513,941 B2 | 4/2009 | Frey et al. | |
| 2009/0098999 A1 | 4/2009 | Frey et al. | |
| 2009/0202298 A1 | 8/2009 | Bjorklund | |

FOREIGN PATENT DOCUMENTS

| | | |
|---|---|---|
| BE | 649560 A | 10/1964 |
| JP | S46-004045 U | 1/1971 |
| JP | S47-3688 U | 9/1972 |
| JP | S62-110315 U | 7/1987 |
| JP | H07-109709 A | 4/1995 |
| WO | WO 98/50636 | 11/1998 |
| WO | WO 03/038191 | 5/2003 |
| WO | WO 2007-092635 | 8/2007 |

OTHER PUBLICATIONS

PCT International Search Report for PCT/US2012/056359 mailed on Feb. 27, 2013, 3 pages.

* cited by examiner

*Primary Examiner* — Euncha Cherry
(74) *Attorney, Agent, or Firm* — Trisha D. Adamson

(57) ABSTRACT

The present application relates to a pavement marker including a core from which extends protrusions and a cavity between adjacent protrusions. The microsphere lenses are fixed within the cavity by one of a softening material disposed in the core and an adhesive agent disposed in the cavity.

12 Claims, 16 Drawing Sheets

RETROREFLECTIVE ELEMENTS

TECHNICAL FIELD

The present application generally relates to retroreflective elements and methods of making and using them.

BACKGROUND

Pavement markings (e.g., paints, tapes, and individually mounted articles) guide and direct motorists and pedestrians traveling along roadways and paths. Paint was a preferred pavement marking for many years. However, modern pavement marking materials offer significant advantages over paint, such as increased visibility, retroreflectance, improved durability, and temporary and/or removable marking options.

Various types of retroreflective elements have been used in pavement markers. For example, International Disclosure Pamphlet 03038191 describes a composition for a pavement marker in which optical (e.g., reflective) elements are at least partially embedded in a binder that is adjacent to a glass or ceramic core. The particle has a softening point higher than the core material, and the reflective element shows at least an approximately 10% increase in the collision strength when compared with the reflective element where the core does not substantially contain particles.

U.S. Pat. No. 5,942,280 describes a method of making a ceramic retroreflective element having enhanced strength and increased retained reflectivity. The method involves forming retroreflective elements by the following steps: a) providing glass flakes; b) coating said glass flakes with a first barrier layer yielding coated glass flakes; c) providing optical elements; d) optionally coating said optical elements with a second barrier layer; e) blending said optical elements and said coated glass flakes; f) heating said optical elements and said coated glass flakes to spheroidize said flakes while agitating said optical elements and said coated glass flakes; g) further heating said optical elements and said spheroidized glass flakes to partially embed said optical elements in said spheroidized flakes while agitating said optical elements and said spheroidized flakes; and h) cooling said spheroidized flakes having partially embedded optical elements.

Japanese Patent Laid-Open No. 7-109709 describes a construction device including a system having a material shutter to control the coating of the material, an edge plate to decide the width of the coating and a film thickness adjusting mechanism to set the thickness of the coating film at the bottom of a hopper with the material inserted in it to carry out the road markings of specified width on the surface of the road. Japanese Patent Laid-Open No. 7-109709 also described a pavement marking method involving dispersing the glass beads before a coating is applied or the material gets dried. The surface of the glass beads is roughened by allowing the contour particles with large particle diameters to protrude out on the coated surface after forming a pectinate shaped board. The thickness of the film is adjusted by using a coating mixed with the contour particles having a particle diameter larger than the thickness of the coating film.

SUMMARY

Pavement markings are subject to continuous wear and exposure to the elements as well as road chemicals. Consequently, there is a need for pavement marking compositions and pavement markers that provide durability and retained reflectivity once applied to a surface. The inventors of the present application recognized that when the existing optical elements are used, the binder and the retroreflective layer can detach from the interface. In addition, when cracks are generated in the glass beads due to stress (e.g., a vehicle driving over the pavement marker), the efficiency of the optical elements is reduced. Consequently, it is difficult to maintain durability of the pavement marker over a long period of time. To address these concerns, the inventors of the present application have invented a more durable retroreflective pavement marker.

The present application relates to a pavement marker, comprising: a core from which extends protrusions; a cavity between adjacent protrusions, the cavity optionally including an adhesive agent that binds at least two microsphere lenses in the cavity. In some embodiments, the adhesive agent includes a reflective colorant. In other embodiments, the microsphere lenses are fixed within the cavity by a softening material included in the core. In some embodiments, the microsphere lenses are glass beads. In some embodiments, greater than or equal to 80% and less than or equal to 100% of the total volume of the microsphere lenses are present in the cavity. In some embodiments, the core has an open area ratio that is greater than or equal to 30% and less than or equal to 100%. In some embodiments, the cavity has a reverse taper shaped cross-section. In some embodiments, the cavity has a plurality of spirally continuing extended slits. In some embodiments, the slits have an open area width that is between 100 µm and 800 µm.

DETAILED DESCRIPTION

Various embodiments will be described. Some embodiments are shown in the Figures. However, the present disclosure is not limited to any specific embodiments described herein or shown in specific figures. Further, unless otherwise indicated, the Figures are not to scale.

The present application relates to a pavement marker including a core from which extends protrusions and a cavity between adjacent protrusions. In one embodiment, the cavity includes an adhesive agent that binds at least two microsphere lenses in the cavity. In another embodiment, the core comprises a softening material that softens upon exposure to heat thereby allowing the microsphere lenses to be fixed within the cavity.

Figure 1A:
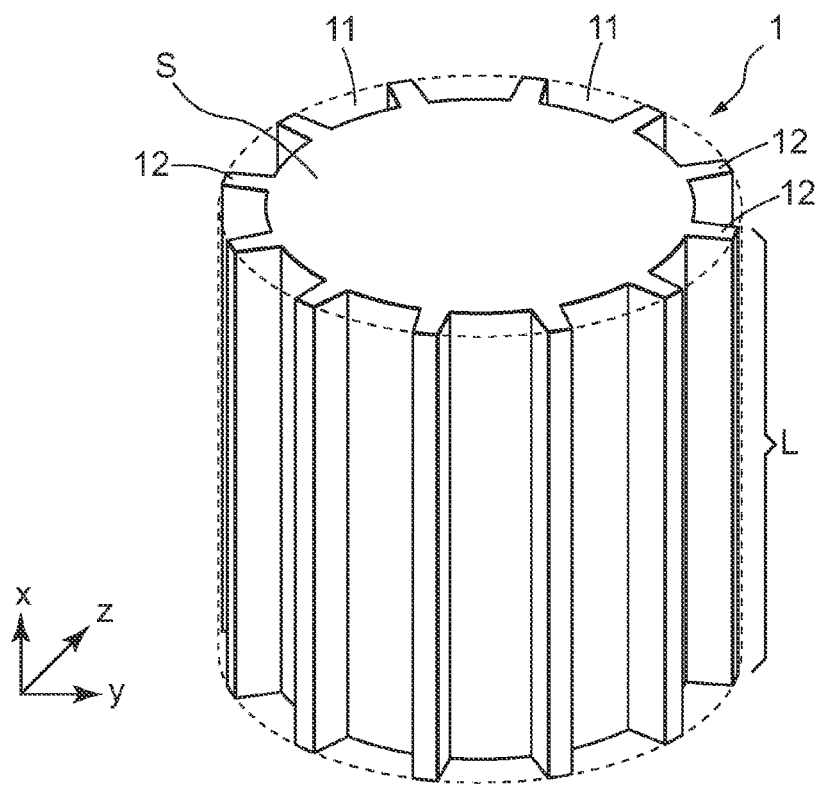
FIG. 1A is a perspective view showing a retroreflective element having a core shape according to the one embodiment of the present disclosure.
Figure 1B:
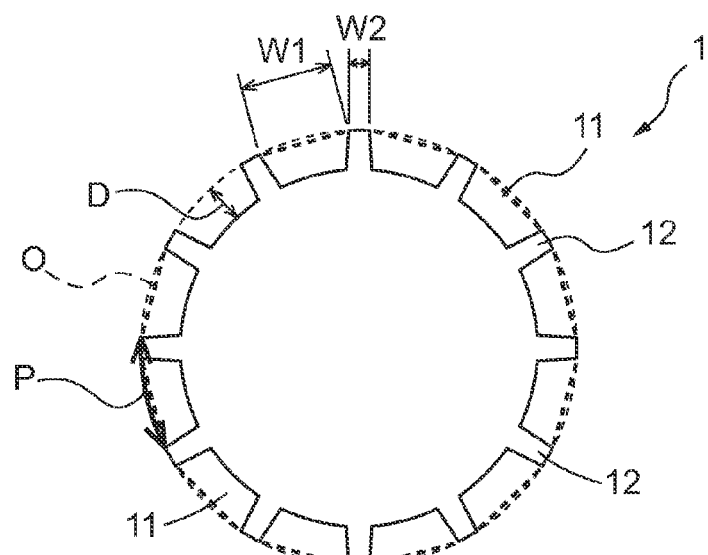
FIG. 1B is a cross-sectional view of the retroreflective element of FIG. 1A along the y-axis.

FIGS. 1A and 1B show one embodiment of an exemplary retroreflective element that includes a core 1 having a generally round core portion S from which a plurality of generally rectangular protrusions 12 extend. Cavities 11 are formed between adjacent protrusions 12. A dotted line having a diameter that corresponds to the maximum diameter of the core is included for convenience in showing cavities 11.

Figure 2:
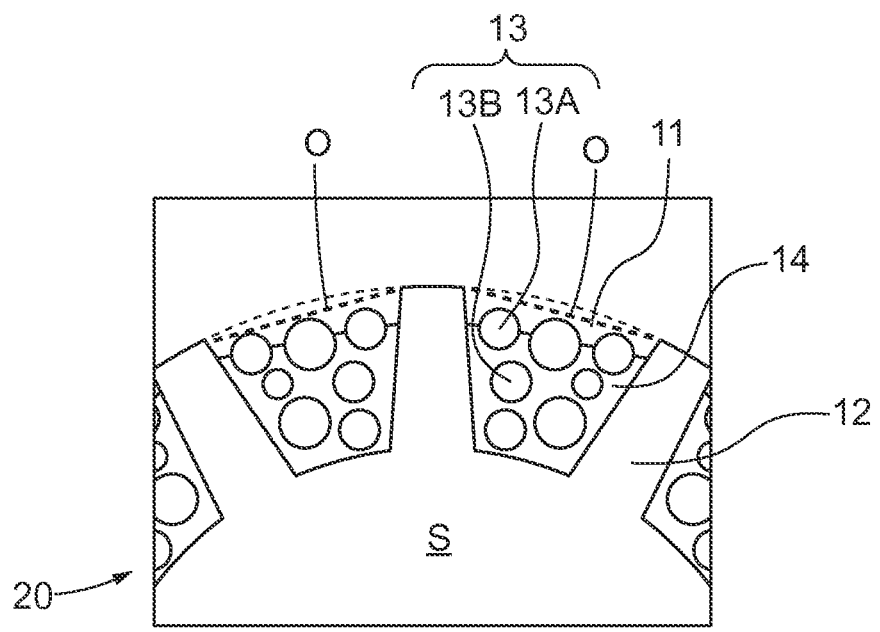
FIG. 2 is a cross-sectional view along the y-axis of a retroreflective element according to another embodiment of the present disclosure.

FIG. 2 is a partial cross-sectional view along the y-axis showing another embodiment of a retroreflective element. The embodiment of FIG. 2 also includes a core 20 having a core portion S from which a plurality of generally rectangular protrusions 12 extend. A dotted line having a diameter that corresponds to the maximum diameter of the core is included for convenience in showing cavities 11. As is shown in FIG. 2, adhesive 14 adheres at least two microsphere lenses 13 (e.g., glass beads) within cavity 11. Microsphere lens 13A is embedded partially in the adhesive, and microsphere lens 13B is fully embedded in the adhesive. As used herein, the concept of a microsphere lens within the cavity refers to one or more microsphere lenses (e.g., glass beads) having at least 80% of their individual physical structure contained within the depth D and width W1 of a cavity.

Protrusions 12 can have any desired width W2. As used herein, pitch P is the distance between corresponding portions of adjacent protrusions 12. For example, the pitch P shown in FIG. 1B is measured between the right-hand corner of adjacent protrusions. In some embodiments, the pitch is between about 100 µm and about 800 µm. In other embodiments, the pitch is between about 200 µm and about 600 µm.

As used herein, the term "cavity" refers to the depression formed between adjacent protrusions 12 extending from the center portion of the core (the reference numerals provided in all definitions herein and their relation to specific figures is exemplary and is not meant to be limiting). A core can have as many or as few cavities as desired. Cavities 12 have a depth D (shown in FIG. 1B) and a width W. Cavities can have any desired depth or width.

As used herein, the depth D of a cavity is the maximum distance between (1) the plane that connects the topmost point of each of two adjacent protrusions (reference numeral O) and (2) the bottommost point of the cavity between those two adjacent protrusions. In some embodiments, the core includes one or more cavities whose depth varies. In some embodiments, the core includes multiple cavities, at least some which have cavity depths that differ from other cavity depths on the same core. In some embodiments, the depth is between about 50 µm and about 500 µm. In some embodiments, the depth is between about 100 µm and about 300 µm.

As used herein, the width W1 of a cavity is the distance between equal locations on adjacent protrusions 12. The cavity width may vary along a cavity's depth. For example, in some embodiments, a cavity has a greater width at its top-most portion than at its bottom-most portion (see, e.g., FIGS. 1B and 2), which is referred to herein as a "reverse taper shape." In other embodiments, a cavity has a greater width at its bottom-most portion than at its top-most portion. As used herein, the term "mean width" refers to the mean of the width measurements along the depth of a single cavity. In some embodiments, the core includes multiple cavities, at least some of which have cavity widths that differ from other cavity widths on the same core. In some embodiments, the mean width is between about 100 µm and about 800 µm. In some embodiments, the mean width is between about 200 µm and about 600 µm.

In some embodiments, the total percentage of cavity area on a single core is between about 30% and about 95%. In some embodiments, the total percentage of cavity area on a single core is between about 40% and about 90%. In some embodiments, the total percentage of cavity area on a single core is between about 50% and about 80%.

Any desired core and/or cavity shape or structure can be used in the retroreflective elements of the present disclosure as long as two microsphere lenses can be adhered within a single cavity. In some embodiments, it may be preferable to have a core and/or cavity shape that can be easily manufactured. Some exemplary core and/or cavity shapes are shown in the figures discussed below.

Figure 3A:
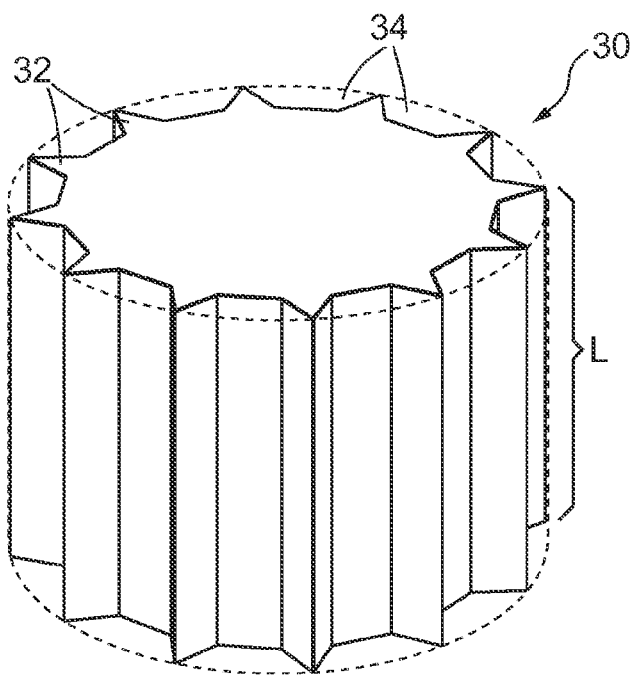
FIG. 3A is a perspective view showing a core shape according to another embodiment of the present disclosure.
Figure 3B:
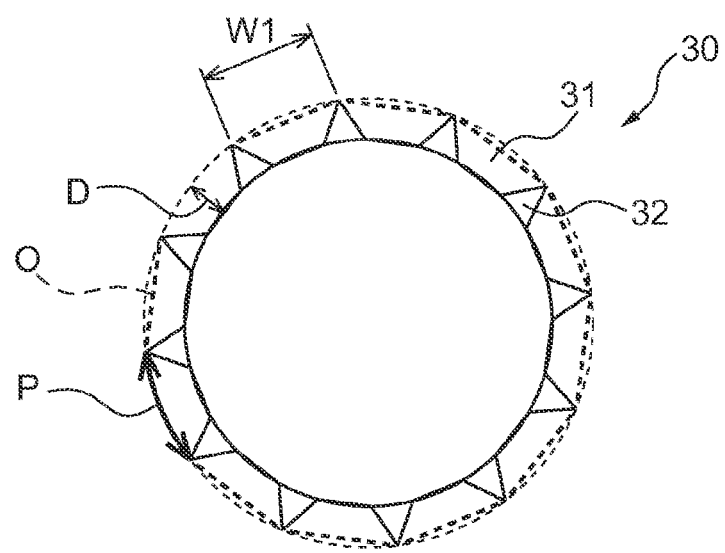
FIG. 3B is a cross-sectional view along the y-axis of the core of FIG. 3A.

FIGS. 3A and 3B show another embodiment of a retroreflective element that includes a core 30 having a generally round core portion S from which a plurality of generally triangular protrusions 32 extend. Cavities 31 are formed between adjacent protrusions 32. A dotted line having a diameter that corresponds to the maximum diameter of the core is included for convenience in showing cavities 31. Although not shown in FIGS. 3A and 3B, at least two microsphere lens can be adhered within cavity 32 by, for example, an adhesive. As shown in FIG. 3B, the width W1 of cavity 31 at the uppermost portion is the same as the pitch P of protrusions 32. In some implementations of this embodiment, the total percentage of cavity area on a single core of the type shown in FIGS. 3A and 3B is between about 90% and about 100%.

Figure 4A:
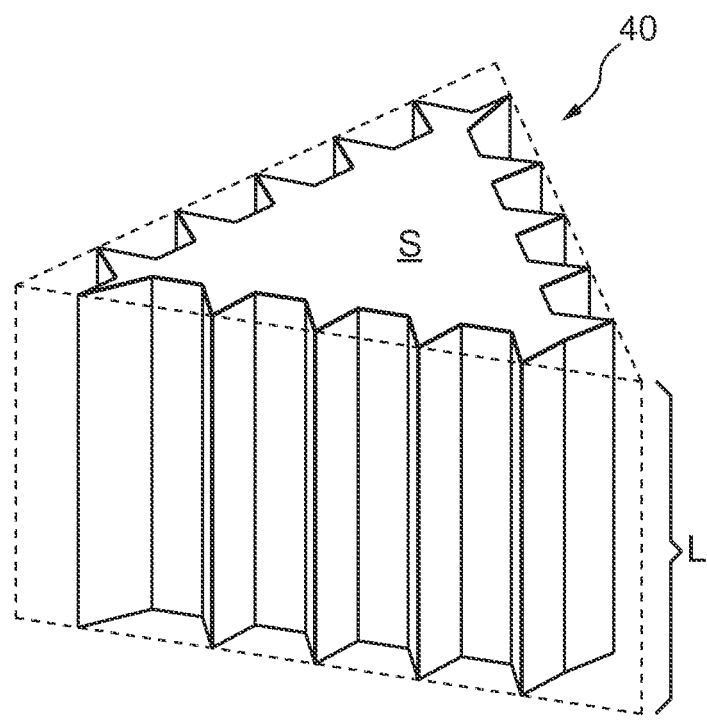
FIG. 4A is a perspective view showing a core shape according to another embodiment of the present disclosure.
Figure 4B:
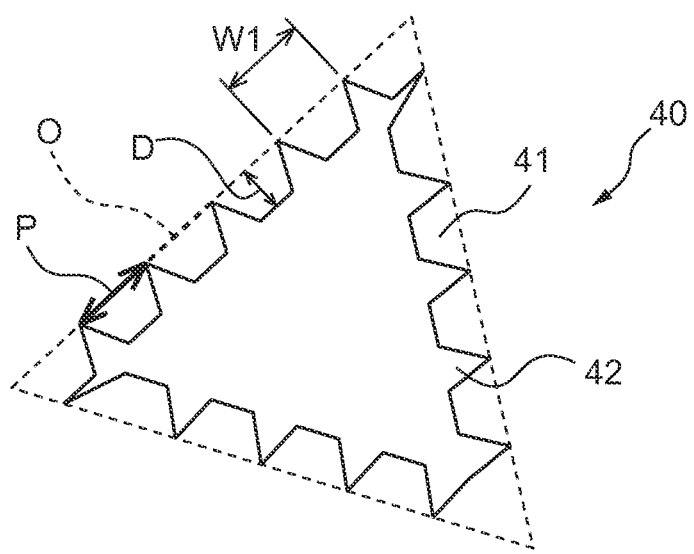
FIG. 4B is a planar view of the core of FIG. 4A from the IV direction.

FIGS. 4A and 4B show another embodiment of a retroreflective element that includes a core 40 having a generally triangular core portion S from which a plurality of generally triangular protrusions 42 extend. Cavities 41 are formed between adjacent protrusions 42. A dotted line having a diameter that corresponds to the maximum diameter of the core is included for convenience in showing cavities 41. Although not shown in FIGS. 4A and 4B, at least two microsphere lens can be adhered within cavity 42 by, for example, an adhesive. As shown in FIG. 4B, the width W1 of the cavity 41 at the uppermost portion is the same as the pitch P of the protrusions 42. In some implementations of this embodiment, the total percentage of cavity area on a single core of the type shown in FIGS. 4A and 4B is between about 90% and about 100%.

Figure 5A:
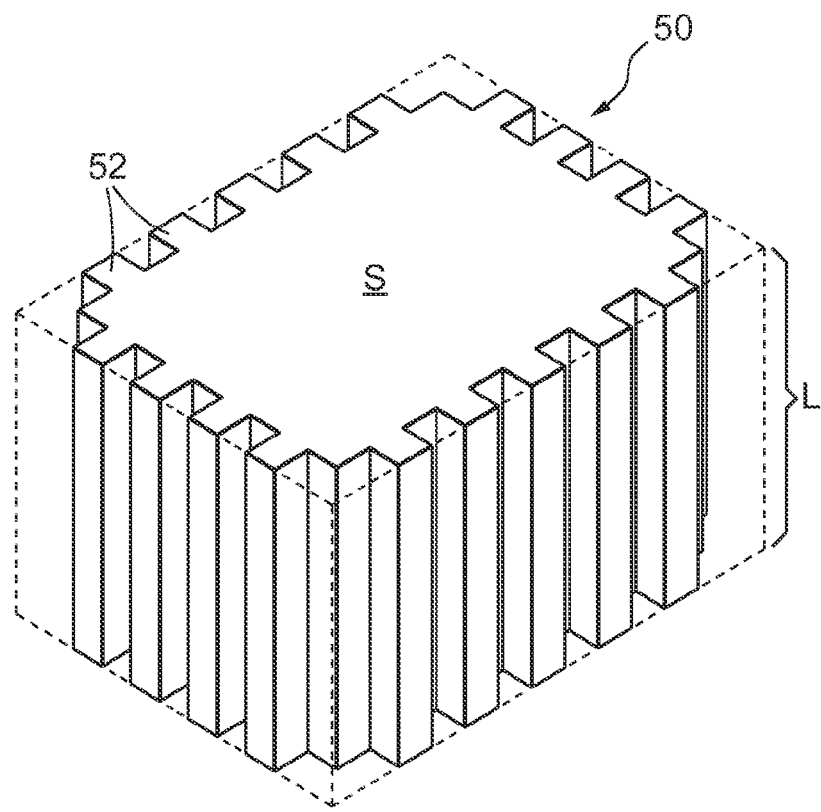
FIG. 5A is a perspective view showing a core shape according to another embodiment of the present disclosure.
Figure 5B:
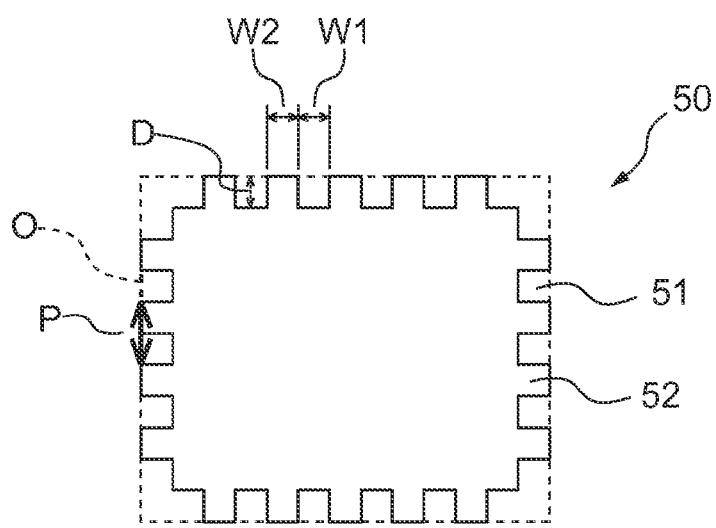
FIG. 5B is a planar view of the core of FIG. 5A from the V direction.

FIGS. 5A and 5B show another embodiment of a retroreflective element that includes a core 50 having a generally rectangular core portion S from which a plurality of generally square protrusions 52 extend. Cavities 51 are formed between adjacent protrusions 52. A dotted line having a diameter that corresponds to the maximum diameter of the core is included for convenience in showing cavities 51. Although not shown in FIGS. 5A and 5B, at least two microsphere lens can be adhered within cavity 52 by, for example, an adhesive. In some implementations of this embodiment, the total percentage of cavity area on a single core of the type shown in FIGS. 5A and 5B is between about 30% and about 60%.

Figure 6A:
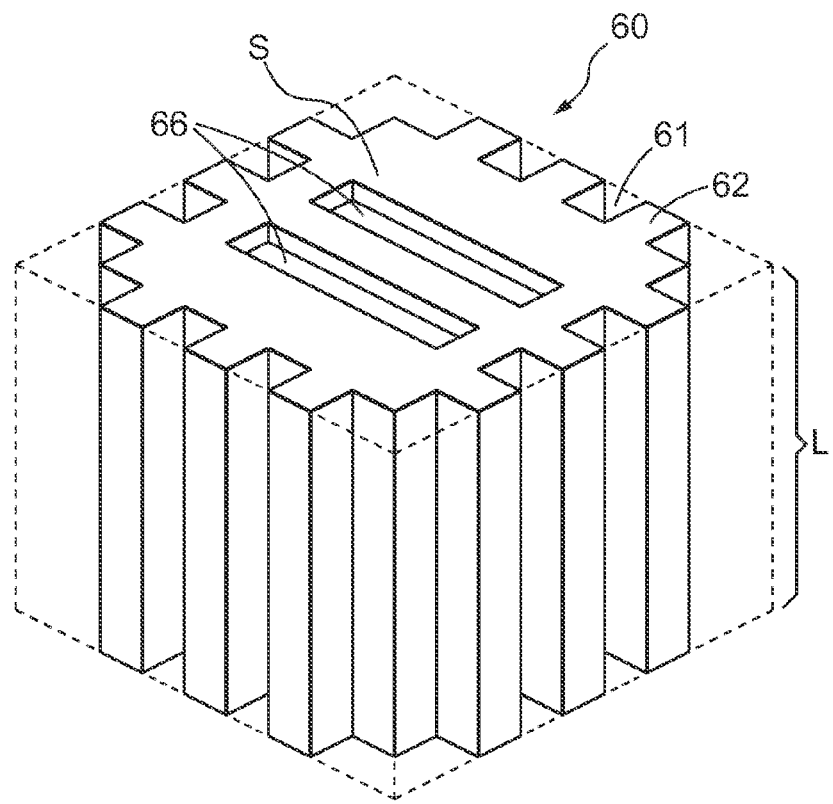
FIG. 6A is a perspective view showing a core shape according to another embodiment of the present disclosure.
Figure 6B:
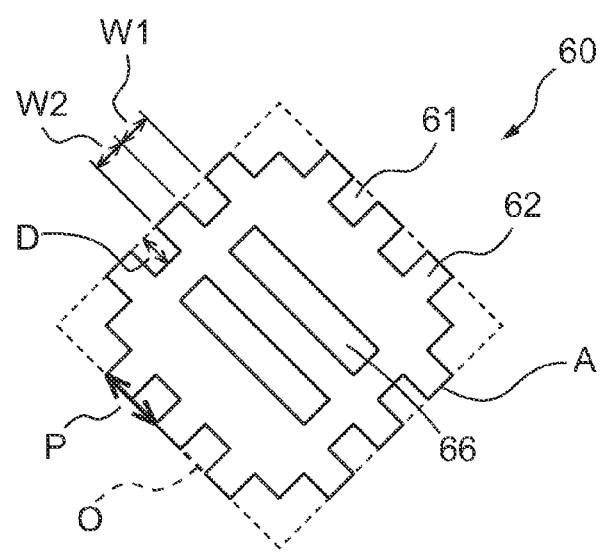
FIG. 6B is a planar view of the core of FIG. 6A from the VI direction.

FIGS. 6A and 6B show another embodiment of a retroreflective element that includes a core 60 having a generally square core portion S including two slits 66. The inclusion of slits 66 can increase the total percentage of cavity area of core 60. A plurality of generally square protrusions 62 extend from core portion S. Cavities 61 are formed between adjacent protrusions 62. A dotted line having a diameter that corresponds to the maximum diameter of the core is included for convenience in showing cavities 61. Although not shown in FIGS. 6A and 6B, at least two microsphere lens can be adhered within cavity 62 by, for example, an adhesive. In some implementations of this embodiment, the total percentage of cavity area on a single core of the type shown in FIGS. 6A and 6B is between about 60% and about 90%.

Figure 7A:
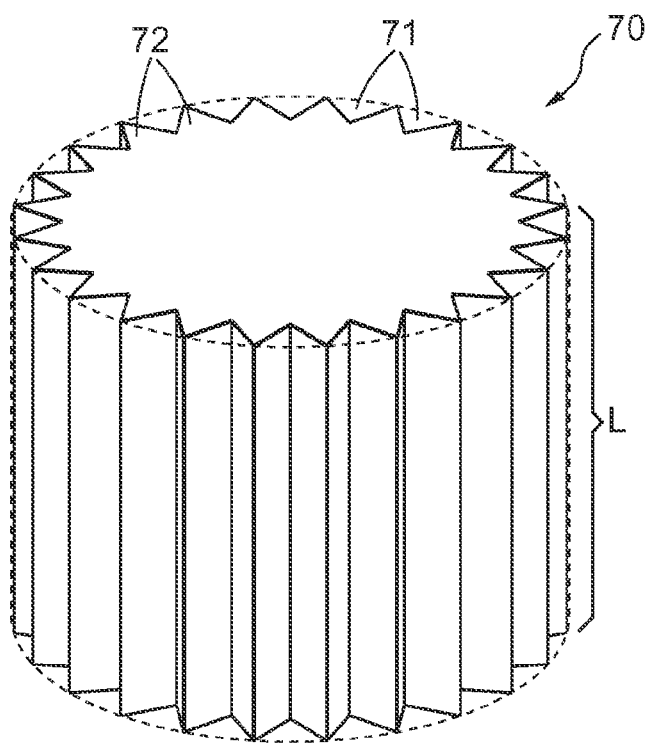
FIG. 7A is a perspective view showing a core shape according to another embodiment of the present disclosure.
Figure 7B:
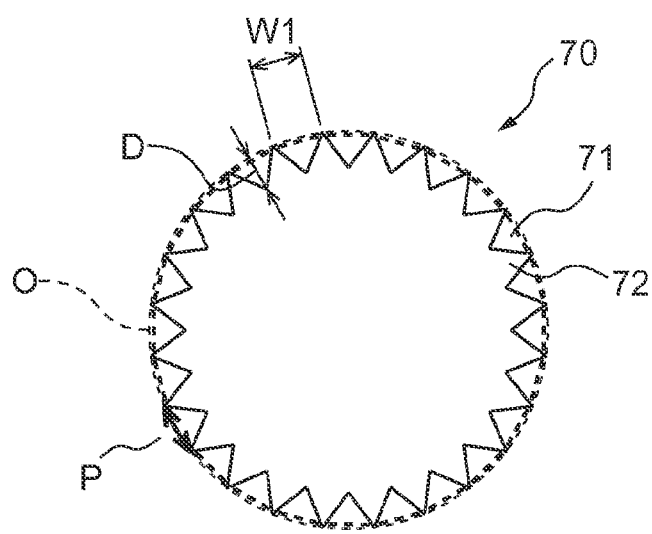
FIG. 7B is a planar view of the core of FIG. 7A from the VII direction.

FIGS. 7A and 7B show another embodiment of a retroreflective element that includes a core 70 having a generally round core portion S. A plurality of generally triangular protrusions 72 extend from core portion S. Cavities 71 are formed between adjacent protrusions 72. A dotted line having a diameter that corresponds to the maximum diameter of the core is included for convenience in showing cavities 71. Although not shown in FIGS. 7A and 7B, at least two microsphere lens can be adhered within cavity 72 by, for example, an adhesive. In some implementations of this embodiment, the total percentage of cavity area on a single core of the type shown in FIGS. 7A and 7B is between about 90% and about 100%.

Figure 8A:
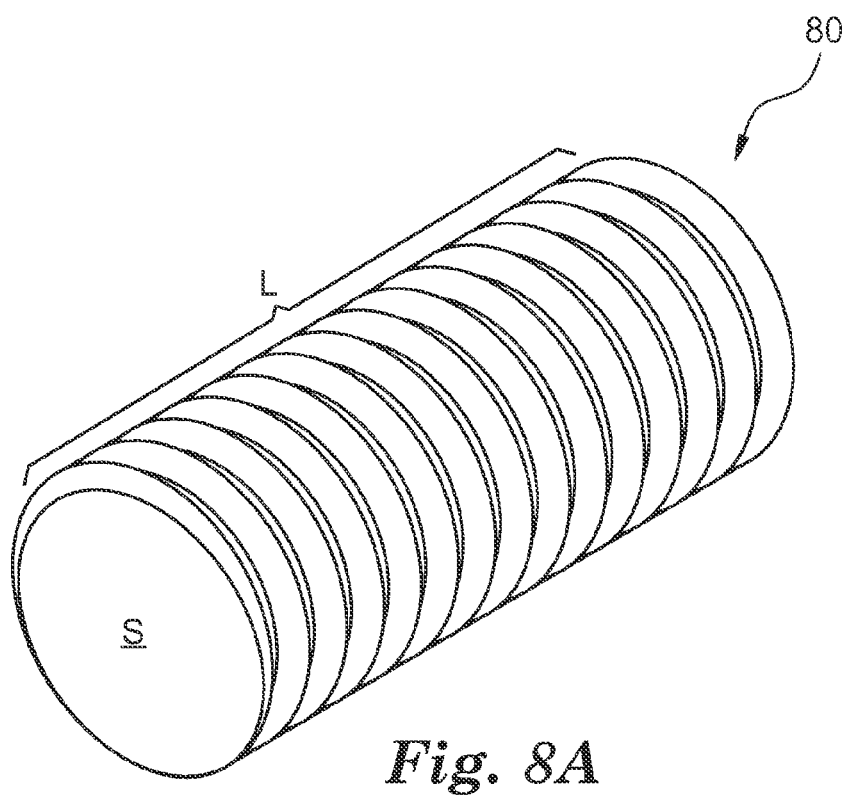
FIG. 8A is a perspective view showing a core shape according to another embodiment of the present disclosure.
Figure 8B:
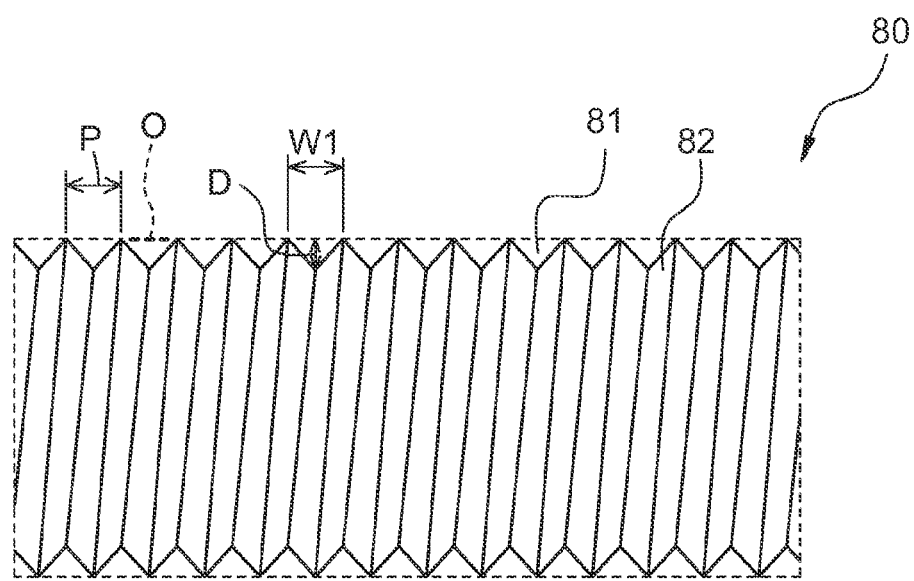
FIG. 8B is a planar view of the core of FIG. 8A from the VIII direction.

FIGS. 8A and 8B show another embodiment of a retroreflective element that includes a core 80 having a generally round core portion S. A generally triangular shaped protrusion 82 extends from core portion S to form a single, elongated, generally helical protrusion. A single, elongated, generally helical cavity 81 is formed between adjacent portions of protrusion 82. A dotted line having a diameter that corresponds to the maximum diameter of the core is included for convenience in showing cavities 81. Although not shown in FIGS. 8A and 8B, at least two microsphere lens can be adhered within cavity 82 by, for example, an adhesive. In some implementations of this embodiment, the total percentage of cavity area on a single core of the type shown in FIGS. 8A and 8B is between about 90% and about 100%.

Figure 9A:
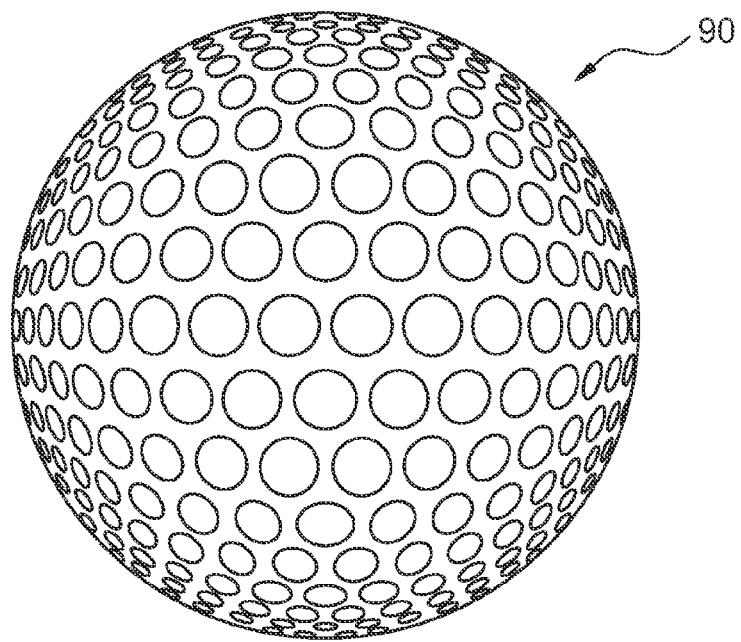
FIG. 9A is a perspective view showing a core shape according to another embodiment of the present disclosure.
Figure 9B:
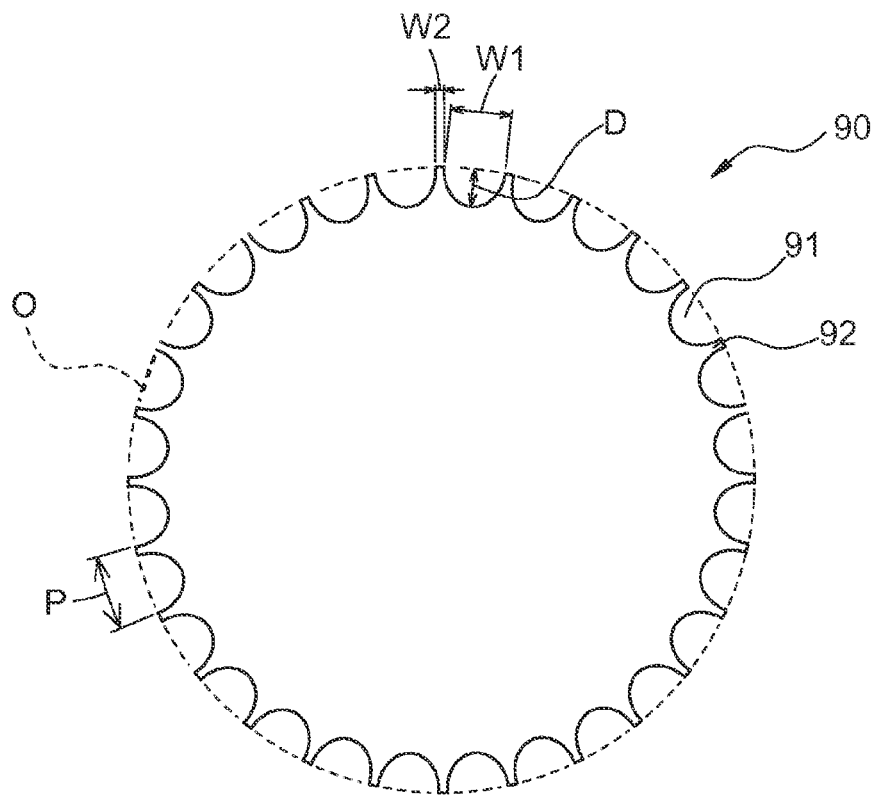
FIG. 9B is a cross-sectional view of IX-IX direction of the core of FIG. 9A.

FIGS. 9A and 9B show another embodiment of a retroreflective element that includes a core 90 having a generally round core portion S. Protrusions 92 extend from core portion S to form a plurality of generally round cavities 81 between adjacent protrusions 92. This shape can be referred to as a "dimple shaped cavity" and resembles a golf ball with dimples. A dotted line having a diameter that corresponds to the maximum diameter of the core is included for convenience in showing cavities 91. Although not shown in FIGS. 9A and 9B, at least two microsphere lens can be adhered within cavity 92 by, for example, an adhesive. In some implementations of this embodiment, the total percentage of cavity area on a single core of the type shown in FIGS. 9A and 9B is between about 90% and about 100%.

FIGS. 10-13 are cross-sectional views showing other embodiments of retroreflective elements.

Figure 10:
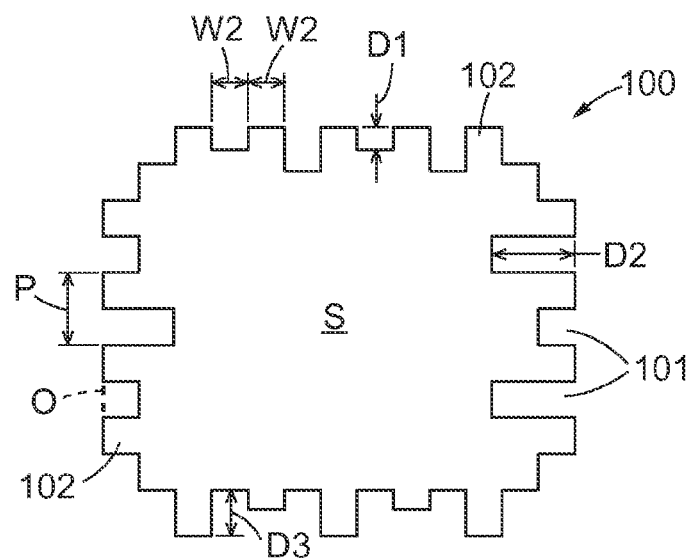
FIG. 10 is a cross-section view exemplifying a cross-sectional shape of the cavity depth direction of a core according to another embodiment of the present disclosure.

FIG. 10 shows a retroreflective element that includes a core 100 having a generally rectangular core portion S. A plurality of generally rectangular protrusions 102 extend from core portion S to form a plurality of generally rectangular cavities 101 between adjacent protrusions 102. There is variability in the depth D of protrusions 102 on core 100. Variable depth can be a way to affect the total percentage of cavity area on a single core. Although not shown in FIG. 10, at least two microsphere lens can be adhered within cavity 102 by, for example, an adhesive. In some implementations of this embodiment, the total percentage of cavity area on a single core of the type shown in FIG. 10 can be between about 50% and about 95%.

Figure 11:
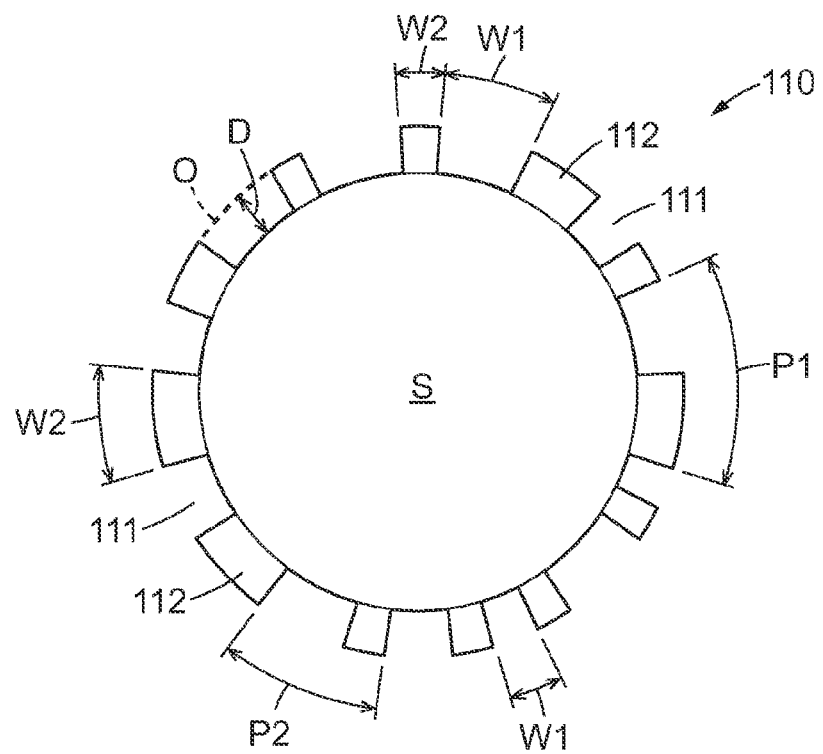
FIG. 11 is a cross-section view exemplifying a cross-sectional shape of the cavity depth direction of a core according to another embodiment of the present disclosure.

FIG. 11 shows a retroreflective element that includes a core 110 having a generally round core portion S. A plurality of generally rectangular protrusions 112 extend from core portion S to form a plurality of cavities 111 between adjacent protrusions 112. There is variability in the cavity width W1, the protrusion width W2, and the pitch P of protrusions 112 on core 110. One or more of variable cavity width, protrusion width, and pitch can be a way to affect the total percentage of cavity area on a single core. Although not shown in FIG. 11, at least two microsphere lens can be adhered within cavity 112 by, for example, an adhesive.

Figure 12:
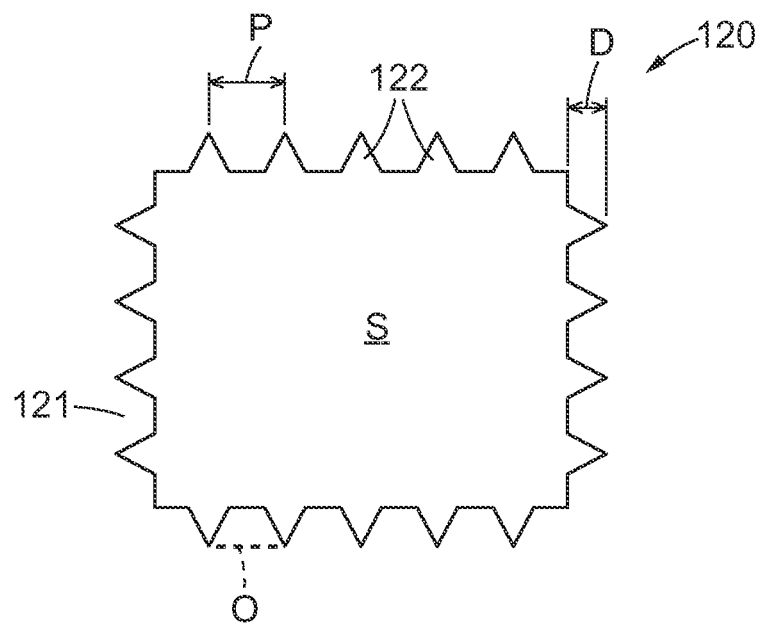
FIG. 12 is a cross-section view exemplifying a cross-sectional shape of the cavity depth direction of a core according to another embodiment of the present disclosure.

FIG. 12 shows a retroreflective element that includes a core 120 having a generally rectangular core portion S. A plurality of generally triangular protrusions 122 extend from core portion S to form a plurality of cavities 121 between adjacent protrusions 122.

Figure 13:
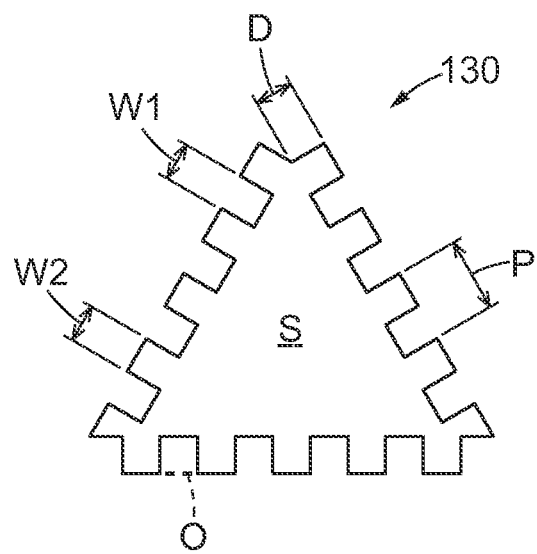
FIG. 13 is a cross-section view exemplifying a cross-sectional shape of the cavity depth direction of a core according to another embodiment of the present disclosure.

FIG. 13 shows a retroreflective element that includes a core 130 having a generally triangular core portion S. A plurality of generally square protrusions 132 extend from core portion S to form a plurality of generally square cavities 131 between adjacent protrusions 132.

In some embodiments, the core has a longitudinal length L of between about 0.3 mm and about 3.0 mm. In some embodiments, the core has a length between about 0.5 mm and about 2.0 mm. In some embodiments, the core has a length between about 0.8 mm and about 1.5 mm. In embodiments where the core is in the shape of a thread, the core length is preferably between about 1.0 mm and about 2.0 mm. As used herein, the length of the core is the maximum length of the (physical) object, and can be measured using a micrometer, (e.g., a micrometer caliper).

The core can be made of any desired material that conveys one or more of the following characteristics: durability, processability, low-cost, and weatherability. In some embodiments, resins may offer excellent processability and low-cost. Exemplary resins include, for example, polycarbonate resin, acrylic resin, and polychlorinated biphenyl. Embodiments including resins in the core may have a Rockwell hardness (M scale, measured in conformity with JIS Z 2245) of between about 70 and about 120, more preferably between about 100 and about 110. In some embodiments, metals may provide excellent durability. Exemplary metals include, for example, aluminum and iron. Embodiments including a metal in the core may have a Vickers hardness (measured in conformity with JIS Z 2245) of between about 800 N/mm$^2$ and about 7,000 N/mm$^2$ in case the metal is a constituent of the core.

In some embodiments, the retroreflective elements of the present disclosure include microsphere lenses (e.g., glass beads) outside of the cavity in addition to the microsphere lenses (e.g., glass beads) within the cavity. In some implementations of such embodiments, at least about 70% or at least about 80% of the total number of microsphere lenses in the pavement marker are in the cavities.

The retroreflective elements described herein include at least two microsphere lenses within a cavity. Glass beads are one exemplary type of microsphere lens. The microsphere lenses can have any desired refractive indices. Some embodiments include microsphere lenses having a refractive index of between about 1.5 and about 2.4. Some embodiments include microsphere lenses refractive indices between about 1.5 and about 2.0. These embodiments exhibit excellent retroreflective properties in dry conditions. The bead size of these beads is typically between about 0.02 mm and about 1.7 mm (measured using a JIS standard sieve). Some embodiments include microsphere lenses refractive indices between about 2.2 and about 2.4. These embodiments exhibit excellent retroreflective properties in wet conditions. The bead size of these beads is typically between about 30 μm and about 90 μm (measured using a JIS standard sieve).

In some preferred embodiments, microsphere lenses with differing refractive indices are used to create a pavement marker that is highly weather-resistant. For example, one implementation of these embodiments includes two or more types of glass beads: (1) those with a refractive index between about 1.5 and about 1.9 (exhibits excellent performance in dry conditions) and (2) those with a refractive index between about 2.2 and about 2.4 (exhibits excellent performance in wet conditions).

The retroreflective elements described herein include at least two microsphere lenses fixed within a cavity. In one embodiment, an adhesive holds the microspheres lenses within the cavity. The adhesive preferably has sufficient strength to ensure that the microsphere lenses do not easily dislodge from the core during stress to the pavement marker (e.g., a vehicle driving over the pavement marker).

In some embodiments, the adhesive includes reflective pigments and/or retroreflective colorants dispersed in a binder. The adhesive may also include a solvent to improve the liquidity of the composition of the adhesive material. Exemplary binders include, for example, acrylic resin, epoxy resin, polycarbonate resin, ABS resin, urethane resin, phenol resin, and silicon resin. Some adhesive embodiments include between about 20% and about 50% reflective pigments and/or retroreflective colorants. The reflective pigments and/or retroreflective colorants assist in retroreflection of incoming light by the pavement marker. Some exemplary reflective pigments and/or retroreflective colorants include, for example, titanium powder (e.g., titanium oxide), mica, pearl pigment, pearl essence pigment, and metallic powders (e.g., aluminum powder, zinc powder, titanium oxide powder, zirconia powder, and silver dust powder). In some embodiments, the preferred adhesives exhibit excellent low temperature flexibility and minimal intensity variation due to moisture absorption. In some embodiments, the preferred adhesives are transparent, colorless, pale yellow, or creamy white. In some embodiments, the preferred adhesive has a diffuse reflectance of between about Y=30 to about Y=60 (measured by placing a 4 μm thick coating of the adhesive on a black film and drying; then exposing the dried adhesive to D65 light of color meter standard).

In another embodiment, the microsphere lenses are fixed within the cavity by a melting and/or softening material disposed in the core. The melting and/or softening material can comprise, for example, ceramics, glass frit or thermoplastic resin. In this embodiment, microsphere lenses are placed in the cavities of the protrusion-containing core and subjected to high temperatures (e.g., 700° C.) for a predetermined period of time (such as, for example, one hour) so that the microsphere lenses sinter to the core. The core is melted and/or softened upon exposure to heat thereby allowing the microsphere lenses to remain fixed or sintered within the cavity. In some embodiments, the melting and/or softening material comprises at least one of a glass frit or a thermoplastic resin, an additive (e.g., reflective (e.g., pearlescent) pigment such as those described above), and a binder (e.g., thermoplastic polymer, cellulose or polyvinyl alcohol). The retroreflective elements of the present disclosure exhibit excellent durability and optical performance. Because the microsphere lenses are positioned in the cavity and are thus not exposed to direct contact with passing vehicles, they are exposed to less stress than currently available pavement markers. Consequently, the pavement markers of the present disclosure can be used for a long period of time without significant loss of retroreflective performance.

The retroreflective elements of the present disclosure can be manufactured through various methods. One exemplary method involved making the core in the desired shape. This can be accomplished by, for example, creating a cavity in a molded core material by, for example, extrusion molding or casting. Alternatively, commercially available items may be used as a core. For example, a screw without a head can be used. Adhesive may be placed on the core by, for example, immersion or agitation. The microsphere lenses are applied to the cavity by, for example, spreading the microsphere lenses in a tray and then rolling or otherwise passing the core material coated with adhesive through the microsphere lenses in the tray. The core is dried and the adhesive is cross-linked, if necessary. The core is then cut in the desired size, if necessary.

Advantages and embodiments of this disclosure are further illustrated by the following examples, but the particular materials and amounts thereof recited in these examples, as well as other conditions and details, should not be construed to unduly limit this disclosure. In these examples, all percentages, proportions and ratios are by weight unless otherwise indicated.

EXAMPLES

Example 1

The core was as follows: two white acrylic resin sticks, each having a diameter of 2 mm and a length of 1,000 mm and a round bar shape (respective nominal Rockwell hardness in conformity with JIS Z 2245, 100 (M scale, used in Example 1) and 78 (M scale, used in Example 2). The acrylic resin sticks were molded using a screw die with a pitch of 0.4 mm to form a core having spiral cavities. The microsphere lenses were glass beads with a high refractive index (obtained from 3M Company, Minnesota, USA, having a refractive index of 2.4) processed with Silane (available as SILQUESTA-1100 from TANAC Co.). The diameter of the glass beads measured using a JIS standard sieve was 30~90 μm.

The adhesive included: polyisocyanurate (Desmodur N320, from Sumika Bayer Urethane Co., Ltd.)—mass ratio 47.9% polyol (available as PLACCEL 303 from Daicel Chemical Industries, Ltd.)—mass ratio 24.0%, pearl pigment (available as IRIODIN 123 from Merc & Co., Inc.)—mass ratio 19.1% Diluent solvent (a compound of isopropyl alcohol/methyl ethyl ketone=2/1 (mass ratio))—9.0% mass ratio. The diffuse reflection of the adhesive was measured as follows: a 40 μm thick layer of the adhesive was coated on the surface of black color film (Scotchcal 3655) and was then allowed to dry. was Y=30. Excess adhesive was removed using a dust-cross. The acrylic resin stick with glass beads attached to it was fried at 65° C. in an oven for 1 hour, causing the glass beads to bind to the acrylic resin stick.

Example 2

The same as Example 1 except that the adhesive included: epoxy adhesive (available as 2247D from Three Bond Co., Ltd.)—mass ratio 41.7% pearl pigment (available as iriodin 123 from Merc & Co., Inc.)—mass ratio 16.6% diluent solvent (a compound of isopropyl alcohol/methyl ethyl ketone=2/1 (mass ratio))—41.7% mass ratio. The diffuse reflection of the adhesive was measured as follows: a 40 μm thick layer of the adhesive was coated on the surface of black color film (Scotchcal 3655) and was then allowed to dry. The measured diffuse reflection was Y=40.

Figure 14A:
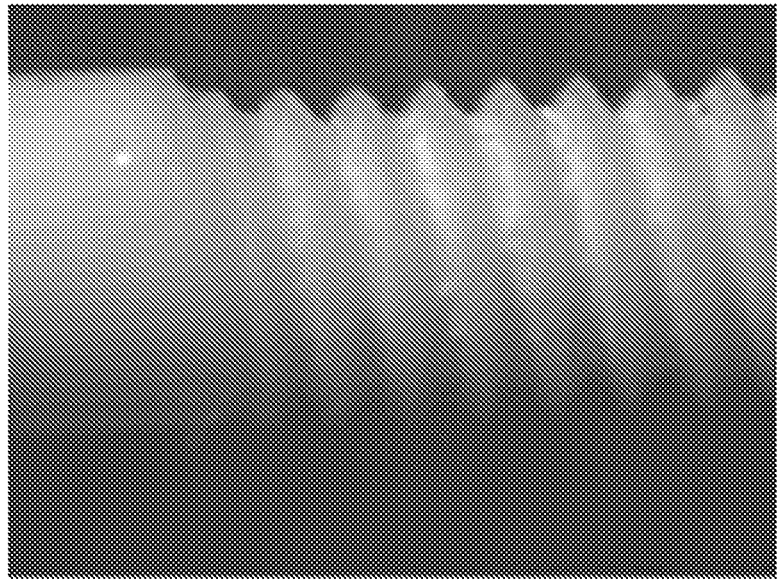
FIG. 14A is a microscopic image of an embodiment in which the core for the retroreflective element is made by manufacturing the thread shape on the round bar.
Figure 14B:
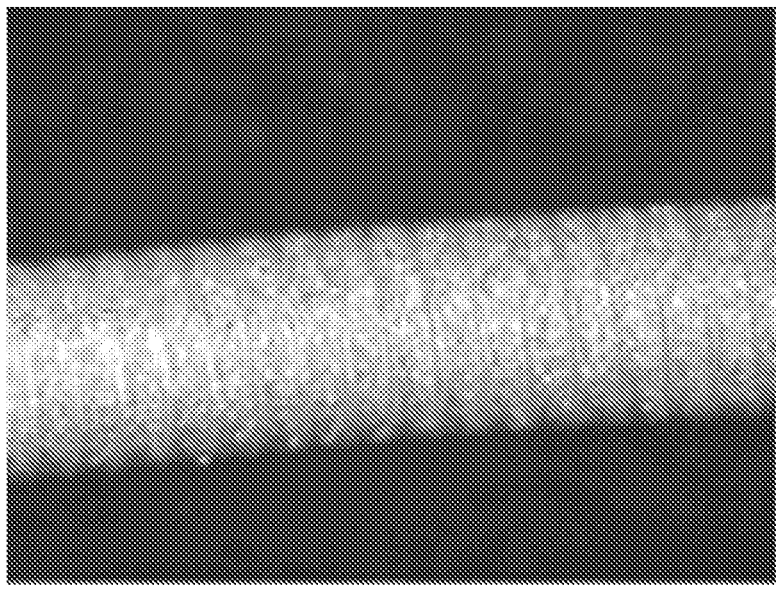
FIG. 14B is a microscopic image of an embodiment in which the glass beads are adhered to a thread-shape core by an adhesive that contains reflective pigments.
Figure 14C:
FIG. 14C a microscopic image of an embodiment in which the retroreflective element includes a thread shape core.
Figure 15:
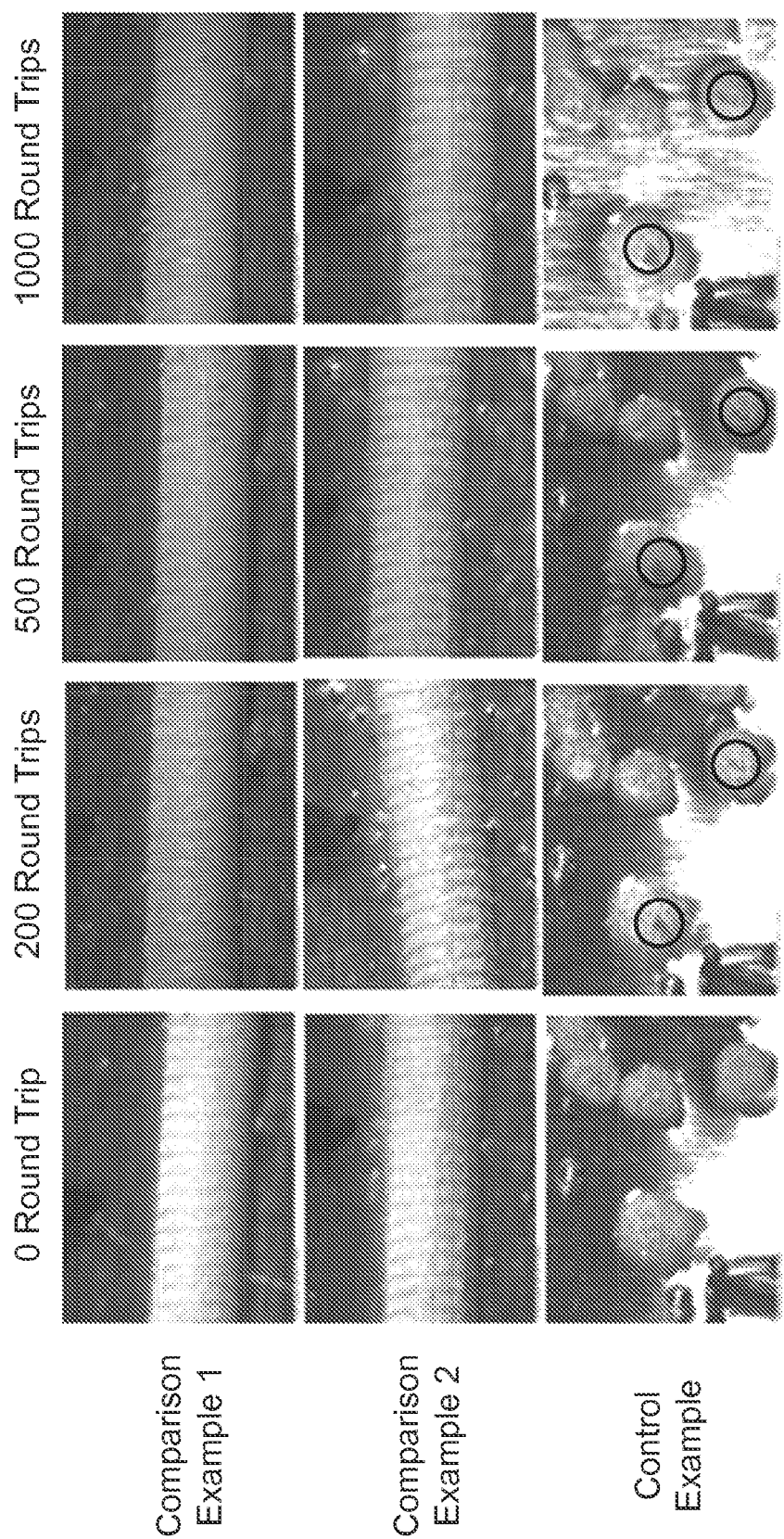
FIG. 15 is a magnified microscopic image after the durability test according to the JSPS test of the Embodiment and the Comparative Example.

FIGS. 14A-14C are microscopic photographic images showing the thread shaped core used in Example 1 and 2. FIG. 14A shows the spiral cavity in a white acrylic resin stick having a diameter of 2 mm. The spiral cavity of FIG. 14A was formed manually by a rotation screw die (M2, 0.4 mm pitch). FIG. 14B shows the spiral cavity of FIG. 14A including glass beads attached thereto. FIG. 14C shows multiple retroreflective elements formed by cutting the spiral cavity of FIG. 14B into pieces each having a length of 1-2 mm. The pieces can then be included in a pavement marker. The retroreflective elements manufactured in Examples 1 and 2 had a core open area ratio of between about 45% and about 55%, a core opening breadth of 400 μm, a cavity depth of 300 μm, and a core diameter of between about 1.5 and about 2.0 mm.

Example 3

A retroreflective element comprising a core and glass beads was provided. The core was prepared by mixing the following raw materials: 235 g of a base material (obtained under the trade designation TH1368M196 from Nippon Frit, Japan), 65 g of a reflective (pearl) pigment (obtained under the trade designation IRIODIN 123), 165 g of a binder (obtained under the trade designation CELNY SL, from Nippon Soda, Japan), and 6 g of a stabilizer (obtained under the trade designation CEOLUS TG-101 from Asahi Kasei). The mixture was molded, cut and dried at 90° C. for 180 min, forming a generally round core comprising eight equally spaced protrusions.

Figure 18:
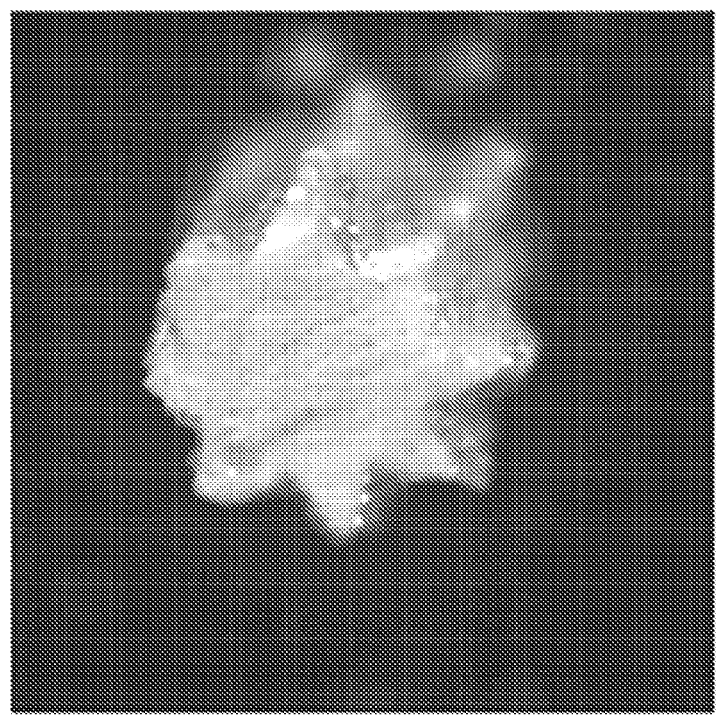
FIG. 18 is a cross-sectional view along the y-axis of a retroreflective element according to one embodiment of the present disclosure.

Glass beads and core were mixed in a 1:2 weight ratio and heated in an electric furnace to a temperature of about 700° C. for about 1 hour, and allowed to cool down to room temperature before being removed from the furnace. FIG. 18 shows the retroreflective element prepared as described in Example 3.

Example 4

A retroreflective element was prepared using a core prepared as described in Example 3. The urethane adhesive agent of Example 1 was used to bond the glass beads to the core, following the procedure outlined in Example 1

Comparative Example

Reflective elements (available as AWT ELEMENTS MIDDLE WHITE 100% 75-030-5930-7 from 3M Co., Ltd. U.S.A) for weatherproof road signs material were used. In general, these elements are microscopic balls in the form of glass beads with a refractive index of 2.4 which are firmly fixed around the core by an adhesive which includes a reflection pigment.

The binding strength of the glass beads to the core was evaluated as the index of durability. 1000 rounds of friction testing were done using Gakushine tester (Tester industry, Model AB-301) by bringing each element in contact with the surface of aluminum foil with epoxy resin applied on it. The element was rubbed with the said rubber sheet embedded in the friction head weighing 500 g. Appearance of the element after friction was evaluated. Results are provided in Table I below.

TABLE I

| | Appearance of the Element after Friction | | |
|---|---|---|---|
| | Appearance | | |
| | After 200 rounds | After 500 rounds | After 1000 rounds |
| Example 1 | Good | Good | Good |
| Example 2 | Good | Good | Good |
| Comparative Example | Falling out of glass bead | Falling out of glass bead | Falling out of glass bead |

Figure 16:
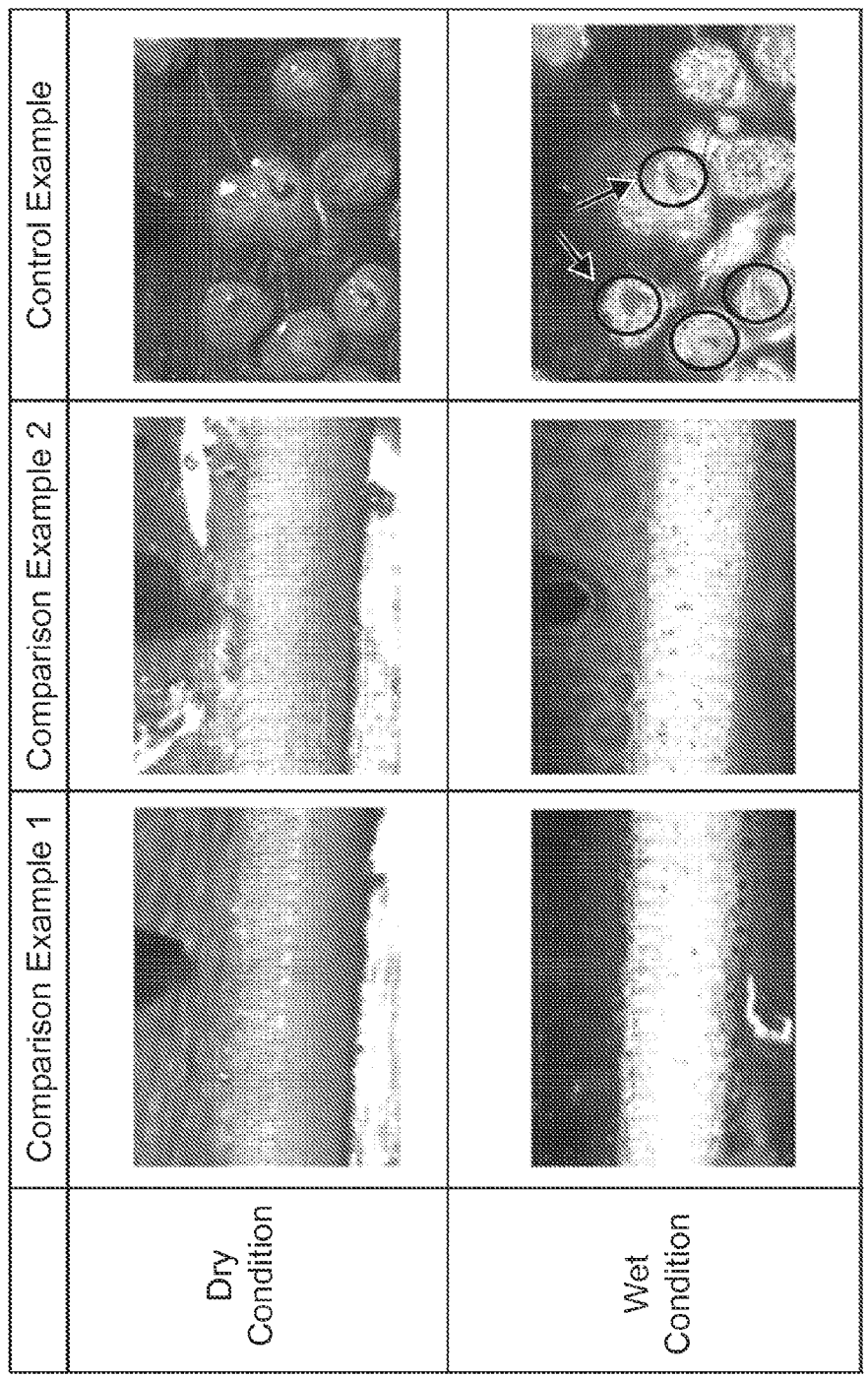
FIG. 16 is a magnified microscopic image of the retroreflective element surface in dry and damp conditions after 1000 round trips durability test according to the JSPS test of the Embodiment and the Comparative Example.

FIG. 16 is a microscopic image of the embodiments and comparative examples where the magnified reflective element shows the results after 1000 rounds of durability testing according to the JSPS test in dry as well as wet conditions. In the figure, the encircled portion is the area which does not show reflexivity due to loss of reflective material. In the comparative example, glass beads fell out of the retroreflective element in both dry as well as damp conditions. However, Examples 1 and 2 showed significantly fewer glass beads falling out of the reflective element. It is presumed that this is because the protrusions protect the glass beads and minimize the incidence of scratches on the surface of glass beads that negatively affect their retroreflectivity. Examples 1 and 2 showed no decrease in performance.

Reflectance (cap brightness OA/EA=0.2°/5°) was measured as follows. Reflection performance of the element was measured in dry as well as damp conditions. Forty (40 g) of retroreflective elements, from each of Examples 1-4 and the Comparative Example, respectively, were uniformly spread on a 185 mm laboratory dish placed on a white plate and the reflectance was measured in a dark room using a mobile reflectance measuring device (ROAD VISTA Co., Ltd. Model 930C). Results are provided in Table 2 below.

TABLE 2

| | Cup brightness (cd/lux/sqm) | |
|---|---|---|
| | Dry condition | Wet condition |
| Example 1 | 0.5 | 2.5 |
| Example 2 | — | — |
| Example 3 | 1.2 | 13.8 |
| Example 4 | 1.2 | 10.1 |
| Comparative Example | 1.5 | 12.5 |

Refractive index (under conditions of actual use) was measured as follows. Glass beads (available as T-16 from Potters Ballotini Co., Ltd. Refractive index of 1.5) were mixed with elements from Examples 1 and 2 and the Comparative Example respectively, and were applied to the surface of a thermoplastic coating (3M weatherproof molten type road signs material). The dispersion area was considered to be 0.15 m². The application amount is shown in Table 3 below.

TABLE 3

Refractive Index Measurements

| | Scattered weight | |
|---|---|---|
| | Reflective element | Glass bead |
| Example 1 | 4.7 g | 3.9 g |
| Example 2 | — | — |
| Comparative Example | 7.8 g | 3.9 g |

Figure 17:
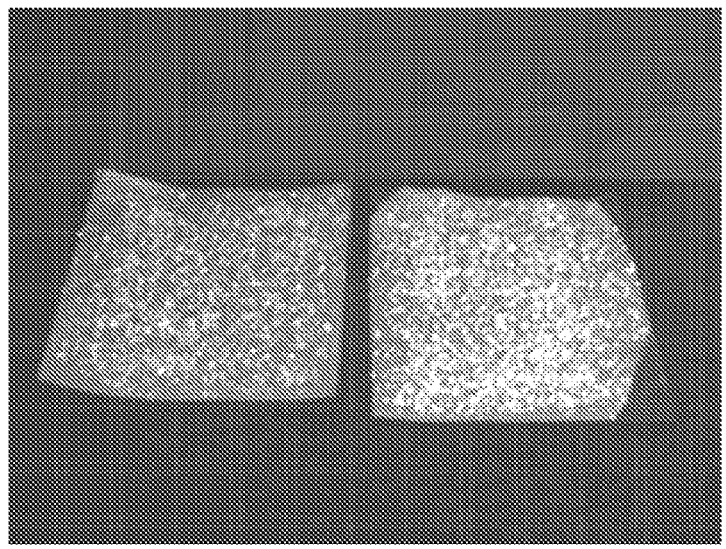
FIG. 17 is an image showing the scattering of light under the reflection brilliance test of the Embodiment and Comparative Example.

FIG. 17 is an image showing a scattering condition of the element offered in the reflection brilliance test according to the usage condition of Examples 1 and 2 and the Comparative Example.

The dispersion mass ratio was scant, which was attributed to the fact that specific gravity was minimal in Example 1 as compared to the Comparative Example. In this experiment, the reflectance was evaluated with the following devices (A) LTL-X (Reflection brightness measurement device for road signs of Traffic Data System make) (OA/EA=1.05°/88.8°) and (B) Mirolux-7 (Potters Ballotini make) (OA/EA=1.5°/86.5°), by taking the spray volume of the element per unit area of the spray region. Results are provided in Table 4 below.

TABLE 4

Reflectance Measurements

| | LTL | | Mirolux | |
|---|---|---|---|---|
| | Dry condition | Wet condition | Dry condition | Wet condition |
| Example 1 | 223 | 228 | 477 | 411 |
| Example 2 | — | — | — | — |
| Comparative Example | 303 | 431 | 668 | 703 |

The retroreflective element according to the invention can be ideally used for marking the road surface, and especially for weatherproof road signs.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A pavement marker, comprising
a core from which extends protrusions;
a cavity between adjacent protrusions; and
microsphere lenses;
wherein the microsphere lenses are fixed within the cavity by one of a softening material disposed in the core and an adhesive agent disposed in the cavity.

2. The pavement marker of claim 1, wherein the microsphere lenses are fixed by an adhesive agent.

3. The pavement marker of claim 2, wherein the adhesive agent or softening material comprises reflective colorant.

4. The pavement marker of claim 1, wherein the microsphere lenses are fixed by a softening material.

5. The pavement marker of claim 4, wherein the softening material comprises ceramic, frit glass or thermoplastic resin.

6. The pavement marker of claim 5, wherein the softening material comprises frit glass.

7. The pavement marker of claim 1, wherein the microsphere lenses are glass beads.

8. The pavement marker of claim 1, wherein greater than or equal to 80% and less than or equal to 100% of the total volume of the microsphere lenses in the pavement marker are present within the cavity.

9. The pavement marker of claim 1, wherein the core has an open area ratio that is greater than or equal to 30% and less than or equal to 100%.

10. The pavement marker of claim 1, wherein the cavity has a reverse taper shaped cross-section.

11. The pavement marker of claim 1, wherein the cavity has a single, continuous, helical protrusion.

12. The pavement marker of claim 1, wherein the protrusions have a width that is between 100 μm and 800 μm.

* * * * *